Jan. 29, 1963    K. A. KIESEL ETAL    3,076,093
RADIO FLUID DETECTOR

Filed Oct. 28, 1958    2 Sheets-Sheet 1

WITNESSES
Edwin C. Bassler
James F. Young

INVENTORS
Kenneth A. Kiesel, Edward L. Webl
Donald V. Smith & Zane L. Collins
BY Donald V. Smith
ATTORNEY

United States Patent Office 3,076,093
Patented Jan. 29, 1963

3,076,093
RADIO FLUID DETECTOR
Kenneth A. Kiesel and Edward L. Webb, Baltimore, Donald V. Smith, Catonsville, and Zane L. Collins, Linthicum Heights, Md., assignors to Westinghouse Electric Corporation, East Pittsburgh, Pa., a corporation of Pennsylvania
Filed Oct. 28, 1958, Ser. No. 770,207
7 Claims. (Cl. 250—71.5)

This invention relates to a radiation detector adapted particularly for use with radioactive gases or other fluids and, more particularly, to gases exhibiting a short range radioactivity such as beta emission.

The measurement of the concentration intensity of radioactivity and particularly that associated with radio-gases is extremely important inasmuch as the permissible tolerance levels of radioactive gases is generally rather low. A radiation detector employed for determining this radiation intensity, therefore, must be extremely sensitive. The gases most frequently of interest are beta emitters, the measurement of which entails a number of problems outlined below. Ionization chambers have been employed in the past for measuring beta emitters with satisfactory results; however, these detectors are necessarily large and difficult to handle. The ionization chamber moreover is inclined to instability when employed over extended periods of time.

The radio fluid detector frequently is employed in connection with atomic plants wherein radioactive gases such as $Kr^{85}$, $Xe^{133}$ and $Xe^{135}$ are likely to be encountered. The energy level of the beta rays from such gases is relatively low and as a result their penetration path in air amounts to only a few inches. These gases, however, obviously are hazardous to breath, and therefore their detection and measurement is vital. Because of the fact that the emitted beta particles are absorbed by a few inches of air, the active portion of the detector must be arranged in proximity to the gas being monitored or detected, and additionally, the surface area of the detector must be comparatively large to achieve the extreme sensitivity required.

Since the activity of interest in most radio-active gases is beta emission, any gamma radiation must be discriminated against. The atomic plants mentioned previously frequently have areas of high gamma activity, and accordingly, the use of conventional beta detectors is not practical. The use of gamma shielding for the detector not only would make the detector bulky and heavy but would be impractical from the standpoint of measuring relatively low energy beta emission.

It is accordingly, an object of the invention to provide a novel and efficient radiation detector.

More specifically, it is an object of the invention to provide a detector of the character described, adapted for use in detecting relatively low range beta emitters particularly when in fluid form.

Another object of the invention is the provision of a radiation counter adapted for detecting and measuring beta activity and insensitive to background gamma radiation.

A further object of the invention is the provision of a beta detector adapted for use in measuring the intensity of radioactive gases or other fluids in the presence of a high level of gamma radiation.

Still another object of the invention is the provision of a beta detector for use in an area of high gamma radiation wherein the necessity of gamma shielding is eliminated.

A further object of the invention is the provision of an extremely sensitive radiation detector adapted to detect minute quantities of low energy beta emitting fluids.

In the course of the forthcoming detailed description of the invention, these and other objects, features and advantages of the invention will be elaborated upon, particularly in conjunction with the accompanying drawings, wherein.

Figure 1:
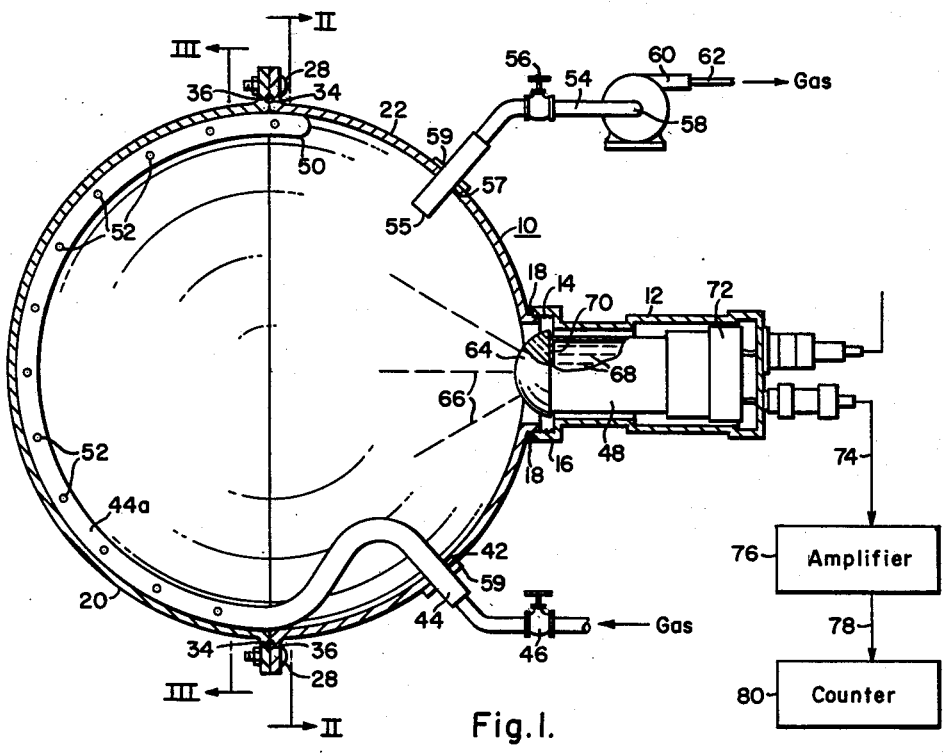
FIGURE 1 is a longitudinally sectioned view of a radiation detector constructed in accordance with the invention and shown in connection with external amplifying and metering circuitry.

There is provided in accordance with the invention a radiation detector for use in detecting low energy beta emitting materials which may be present in a surrounding medium or environment such as air in relatively minute quantities. The sensitivity of the radiation detector of the invention is increased considerably by employing a scintillating phosphor which is sensitive to beta particles and by introducing the beta emitting material, in fluidized form, as close to and over as large an area of the phosphor as is practical. Means are associated with the detector for collecting the light output of the phosphor and translating the same into an electrical signal for subsequent amplification and measurement. The radiation detector of the invention is arranged so that the aforementioned phosphor and other components of the detector are relatively insensitive to a high level of gamma background radiation.

Referring now more particularly to the drawings, the invention as exemplified therein comprises a spheroidal shell or housing 10 to which a photomultiplier tube housing 12 is secured. The housing 12 desirably is of a generally cylindrical contour and is threaded at its open end into an aperture 14 formed in the wall of the shell 10. In order to seal the housings 10 and 12, the housing 12 is provided with an annular flange 16 which, when the housing 12 is threaded into the shell 10, is adapted to compress a gasket 18 between the flange 16 and the adjacent wall portion of the shell 10.

For ease in fabricating the radiation detector, the shell 10 desirably is formed from hemispherical portions 20 and 22. To the right-hand hemispherical portion 22, as viewed in FIG. 1 of the drawings, the photomultiplier housing 12 is secured in the manner described previously. Each of the hemispherical portions 20 and 22 are provided with opposing flanges 24 and 26, respectively. These flanges 24 and 26 are secured together by a plurality of mounting bolts 28 which are inserted respectively through suitable apertures in the flange 24 and threaded into tapped apertures in the flange 26.

One of the flanges, for example, the flange 26 is provided with an annular groove 34 disposed inwardly of the array of mounting bolts 28. Into the groove 34 is inserted a sealing O-ring 36 whereby the junction between the flanges 24 and 26 is sealed upon tightening the mounting bolts 28.

Figure 4:
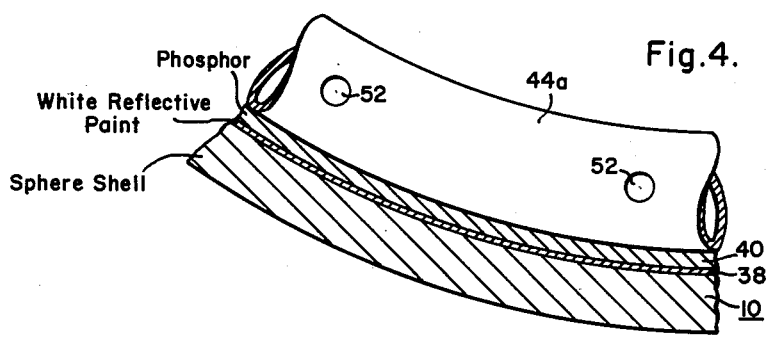
FIG. 4 is an enlarged sectional view of a wall portion of the radiation detector shown in FIG. 1.
Figure 2:
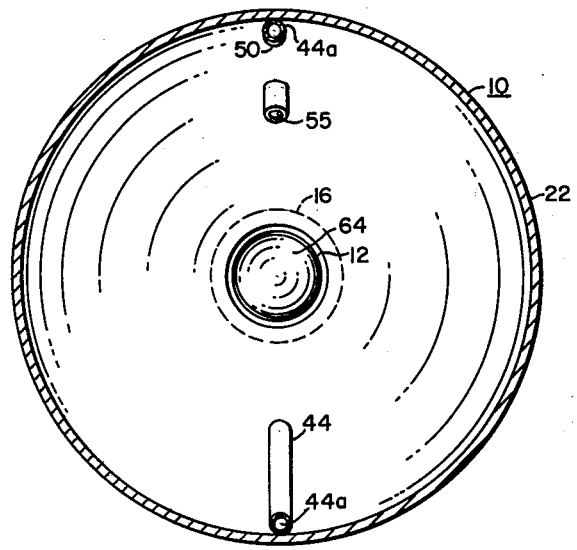
FIG. 2 is a cross-sectional view showing the radiation detector of FIG. 1 and taken along reference line II—II thereof.

As better shown in FIG. 4 of the drawings, the internal surfaces of the hemispherical portions 20 and 22 are coated with a layer 38 of a reflective white paint such as White Reflector Lacquer made by Interchemical Corporation, 350 Fifth Avenue, New York, New York as their Ma 922F. Subsequently, a layer 40 of beta or electron-sensitive phosphor is applied to the inner surface of the shell 10. Any suitable phosphor in this category can be employed for the coating or layer 40, for example, zinc sulphide. The coating 40 desirably is applied in accordance with known methods, for example, by spraying a suspension of pulverulent phosphor in a suitable carrier. In this manner, the entire inner surface of each of the hemispherical portions 20 and 22 (FIG. 1) are coated with a phosphor layer 40.

Care should be taken in applying the phosphor, however, to ensure that the phosphor particles are not covered by a relatively thick layer of the carrier.

The hemispherical portion 22 is provided with an additional opening 42 through which an inlet conduit 44 is inserted. The inlet conduit 44 is provided with a valve 46 and after entering the shell 10 extends around a major proportion of the inner periphery thereof.

Figure 3:
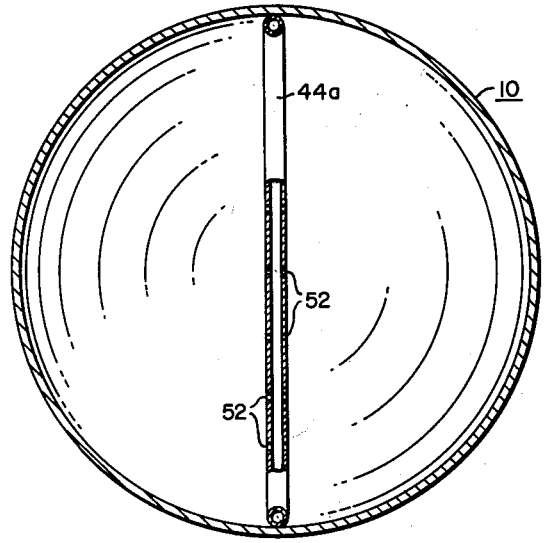
FIG. 3 is a cross-sectional view showing the radiation detector of FIG. 1 and taken along reference line III—III thereof.

As better shown in FIG. 3 of the drawings, the internal portion 44a of the inlet conduit in this example follows generally the path of the great circle of the spheroidal shell 10 and is juxtaposed to a photomultiplier tube 48. The inlet tube 44 terminates within the shell 10 in a closed end portion denoted generally by the reference character 50. In this arrangement of the invention, the internal portion 44a of the inlet tube is provided with a plurality of spaced flow apertures 52 extending transversely through the wall of the tube poriton 44a. As better shown in FIGS. 1 and 4 of the drawings, the apertures 52 are positioned so that a medium containing radioactive material can flow outwardly of the conduit portion 44a via the apertures 52 at positions relatively close to the adjacent phosphor layer 40. The purpose of this arrangement is to minimize the absorption of the beta particles by any of the fluid media or atmosphere contained within the shell 10 before the beta particles contact the phosphor layer 40. Inasmuch as the pressure within the shell 10 is substantially at atmospheric pressure, the ionization or secondary electron emission induced within the aforesaid fluid medium by gamma radiation is negligible.

The fluid medium thus admitted to the interior of the shell 10 is exited therefrom by means of an outlet conduit 54 provided with a suitable valve means 56 for adjusting the flow therethrough. The inner open end 55 of the outlet conduit is inserted through an aperture 57 in the hemispherical portion 22 and to preserve the integrity of the shell or housing 10 both the outlet conduit 54 and the inlet conduit 44 can be sealed at their points of entry into the shell 10 by means of the annular sealing welds 59. The outlet conduit 54 is coupled to the suctional side 58 of a conventional blower 60 whereby the fluid medium is drawn through the shell 10 of the detector. Since the fluid medium may contain radioactive material as discussed previously, the discharge of the blower 60 desirably is coupled to a suitable waste disposal arrangement (not shown) by means of conduit 62.

In the operation of the radiation detector according to the present understanding of the invention, a fluid medium containing radioactive beta emitting material is drawn into the inlet conduit portion 44a and is released therefrom through the plurality of apertures 52. The beta particles emitted by the radioactive material contained within the fluid react with particles of the phosphor coating 40 to produce scintillations or light pulses therein. The scintillations of the coating 40 are collected by a lens 64 as denoted by light rays 66 and are transmitted to the adjacent photo cathode window 70 of the photomultiplier tube 48 as denoted by the parallel light rays 68. Suitable photomultiplier tubes 48 are commercially available and need not be described here in detail, save to say that the tube 48 is mounted in a socket denoted generally by the reference numeral 72. A source (not shown) of high voltage is coupled to the socket 72 and thence to the tube 48 by suitable leads (not shown). In the arrangement shown, the output signal of the phosphor tube 48 is coupled, as designated by a conductor 74 to suitable external amplifying circuitry denoted by the reference numeral 76 and labeled "amplifier" in the arrangement of FIG. 1. The output of the amplifying circuitry 76 is coupled as indicated by conductor 78 to suitable counting or metering circuitry denoted by the numeral 80 and labeled "counter" in FIG. 1.

The cathode 70 of the photo tube is disposed adjacent the inner periphery of the shell 10 and the lens 64 desirably is capable of a wide angle of resolution, in accordance with well-known optical principles, so that substantially all of the scintillations produced in the phosphor coating 40 are visible to the cathode 70 of the photomultiplier tube. By virtue of this fact and the fact that the radioactive material is emitted as close as practical to the phosphor coating 40, the radiation detector described herein is rendered extremely sensitive in detecting beta particles. On the other hand, the absence of a relatively low-density atmosphere within the shell 10, the use of relatively thin coating layers 38 and 40, and the use of a shell 10 having relatively thin wall portions, renders the radiation detector insensitive to gamma radiation. It has been found, as a matter of fact, that the radiation detector described herein can operate in a background of gamma activity of the order of 20 milliroentgens per hour and with a beta sensitivity of $4 \times 10^{-8}$ to $4 \times 10^{-5}$ microcuries per cubic centimeter.

It will be apparent from the foregoing description that a novel and efficient form of radiation detector has been described herein. The accompanying descriptive materials have been presented for purposes of exemplifying the invention, and are not, therefore, intended to be limitative thereof.

Accordingly, numerous modifications and embodiments of the invention will occur to those skilled in the art without departing from the spirit and scope of the invention. For example, the detector disclosed herein is readily adaptable for use with fluidized, alpha-emitting material, particularly with respect to short-range alpha particles.

What is claimed as new therefore is:

1. A radiation detector comprising a hollow shell adapted for enclosing a fluid medium therein, a scintillational phosphor coating applied to an inner surface of the wall of said shell, a conduit disposed in said shell adjacent said inner surface for conducting a fluid into said shell and having aperture means therein for emitting said fluid to the interior of said shell at positions closely adjacent said coating, and means for translating light emitted from said coating into an electrical indicating signal.

2. A radiation detector comprising a hollow shell adapted for enclosing a fluid medium therein, a scintillational phosphor coating applied to an inner surface of the wall of said shell, a conduit disposed in said shell adjacent said inner surface for conducting a fluid into said shell and having aperture means therein for emitting said fluid to the interior of said shell at positions closely adjacent said coating, means for withdrawing said fluid from said shell whereby samples of said fluid can be monitored continuously, and means for translating light emitted from said coating into an electrical indicating signal.

3. A radiation detector comprising a hollow spheroidal shell capable of enclosing a fluid therein, a phosphor coating applied to substantially the entire internal surface of the wall of said shell, means for conducting a fluid to a substantial area of said coating, means for translating light emitted by said coating into an electrical indicating signal, said last-mentioned means including a photo-tube having a cathode mounted adjacent the inner wall surface of said spheroidal shell, and a light collecting lens mounted within said shell and adjacent said cathode whereby light from substantially all portions of said coating is collected and transmitted to said cathode.

4. A radiation detector comprising a hollow shell adapted for enclosing a fluid medium therein, a phosphor coating applied to an inner surface of said shell, means for conducting a fluid into said shell and for conducting said fluid to a substantial area of said coating, means for translating light emitted from said coating into an electrical indicating signal, said first-mentioned means including an inlet conduit extending through said shell and adjacent the internal surface thereof, said conduit having a plurality of flow apertures extending through the wall thereof and positioned adjacent said coating.

5. A radiation detector comprising a hollow shell adapted for enclosing a fluid medium therein, a phosphor coating applied to an inner surface of said shell, means for conducting a fluid into said shell and for conducting said fluid to a substantial area of said coating, and means for translating light emitted from said coating into an electrical indicating signal, said first-mentioned means including an inlet conduit extending through said shell and adjacent the internal surface thereof, said conduit having a plurality of flow apertures extending through the wall thereof and positioned adjacent said coating, and a second conduit extending through the wall of said shell for withdrawing fluid emitted from said apertures from said shell.

6. A radiation detector comprising a hollow spheroidal shell capable of retaining a fluid therein, a phosphor coating deposited upon the internal surface of the wall of said shell, an inlet conduit extending through a wall of said shell and disposed adjacent said coating, said conduit extending around a substantial proportion of the inner circumference of said shell and following the path of a great circle of said shell, said conduit having a plurality of flow apertures extending transversely through a wall portion thereof and disposed in proximity to said coating, and means juxtaposed to said inlet conduit for translating light emitted by said coating into an electrical indicating signal.

7. A radiation detector comprising a hollow shell capable of enclosing a fluid therein, a phosphor coating applied to a substantial portion of the internal surface of the wall of said shell, means for conducting a fluid to a substantial area of said coating, a photo-tube mounted within said shell and having a photo-cathode disposed adjacent the inner periphery of said shell whereby said substantial portion of the internal surface of said shell is visible to said cathode, said first-mentoned means including an inlet conduit extending through a wall of said shell and having a length thereof extending about the inner periphery of said shell, said inner length having a plurality of flow apertures extending transversely therethrough and disposed adjacent said coating, said inlet conduit length being juxtaposed to said photo-cathode.

References Cited in the file of this patent

UNITED STATES PATENTS

| | | |
|---|---|---|
| 2,681,416 | Thompson | July 15, 1954 |
| 2,755,391 | Keyes | July 17, 1956 |
| 2,884,529 | Eggler et al. | Apr. 28, 1959 |
| 2,900,516 | Davis et al. | Aug. 18, 1959 |
| 2,900,518 | Good | Aug. 18, 1959 |
| 2,961,541 | Ruderman | Nov. 22, 1960 |
| 3,005,100 | Thompson | Oct. 17, 1961 |

OTHER REFERENCES

Scintillation Counter for Assay of Radon Gases, by Van Dilla et al., Nucleonics, February 1955, vol. 13, No. 2, pages 68 and 69.